United States Patent Office
3,632,852
Patented Jan. 4, 1972

3,632,852
HEXAHYDROBENZOFUROFURO[3,2-c]
QUINOLINE COMPOUNDS
Edward F. Elslager and Donald F. Worth, Ann Arbor, Mich., assignors to Parke, Davis & Company, Detroit, Mich.
No Drawing. Filed Mar. 17, 1969, Ser. No. 807,982
Int. Cl. C07d 99/04
U.S. Cl. 260—287 R     5 Claims

ABSTRACT OF THE DISCLOSURE

A series of 2,3,3a,4,5,12d-hexahydro-12d-methyl-4-phenylbenzofuro[3,2 - f]furo[3,2-c]quinoline compounds, optionally substituted at the para position of the 4-phenyl group by hydroxy, lower alkoxy, lower cycloalkyloxy, or acyloxy. The compounds have hypocholestermic activity and can be produced by (a) reacting an N-benzylidene-2-dibenzofuranamine compound with 5-methyl-2,3-dihydrofuran in the presence of a Lewis acid, (b) converting a hydroxy group to a lower alkoxy or lower cycloalkyloxy group, (c) esterifying a hydroxy group, or (d) hydrolyzing an ester group.

SUMMARY AND DETAILED DESCRIPTION

This invention relates to new heterocyclic nitrogen compounds. More particularly, it relates to new hexahydrobenzofurofuro[3,2-c]quinoline compounds of the formula

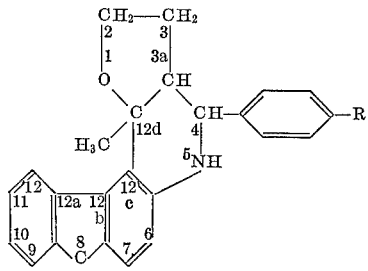

including salt forms thereof, and to methods for their production. In this formula R, represents hydrogen, hydroxy, lower alkoxy, lower cycloalkyloxy, or —OAc; where Ac represents an acyl radical of a carboxylic acid. The lower alkoxy and lower cycloalkyloxy groups included in the scope of the term R are alkoxy and cycloalkyloxy groups containing not more than 6 carbon atoms. As illustrated in specific embodiments herein, Ac preferably represents an acyl radical of a carboxylic acid containing not more than 20 carbon atoms and containing no elements other than carbon, hydrogen, oxygen, nitrogen, sulfur, and halogens. Some specific types of such acyl radicals, according to the invention, are (a) Acyl radicals of hydrocarbon carboxylic acids containing not more than 20 carbon atoms, (b) Acyl radicals of hydrocarbon carboxylic acids containing not more than 14 carbon atoms and additionally substituted by halogen, phenoxy, monohalophenoxy, dihalophenoxy, trihalophenoxy, monomethoxy, dimethoxy, or trimethoxy, said substituted acyl radicals thereby being acyl radicals of carboxylic acids containing not more than 20 carbon atoms, (c) Acyl radicals of nicotinic acid, 3-pyridineacetic acid, 5-methylpyrazole - 3 - carboxylic acid, 2-chlorocinchoninic acid, furancarboxylic acid, and thiophenecarboxylic acid, (d) Acyl radicals of O-acetylmandelic acid, N-[1-methyl-2,3-bis(p-chlorophenyl)propyl]maleamic acid, and 2-methyl-2-[p-(1,2,3,4-tetrahydro - 1 - naphthyl)phenoxy] propionic acid.

In the above formula and description, the preferred halogens are chlorine and bromine, especially chlorine, and the preferred lower alkoxy group is methoxy.

The compounds of the invention exist in various isomeric forms. In all of the compounds of the invention the 3a-hydrogen atom and the 12d-methyl group have the cis-configuration relative to each other. When the phenyl or substituted phenyl group at position 4 has the trans-configuration relative to the 3a-hydrogen atom and the 12d-methyl group, the compound is designated "isomer A." When the phenyl or substituted phenyl group at position 4 has the cis-configuration relative to the 3a-hydrogen atom and the 12d-methyl group, the compound is designated "isomer B." Each of isomer A and isomer B exists in racemic form as well as optically active d- and l- forms. As indicated above and further explained below, the compounds also exist in salt forms, and the hexahydrobenzofurofuro[3,2-c]quinoline formulas herein are to be interpreted as including the salt forms.

In accordance with the invention, the foregoing compounds can be produced by reacting an N-benzylidene-2-dibenzofuranamine compound of the formula

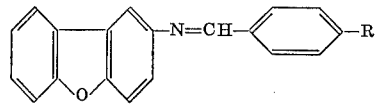

with 5-methyl-2,3-dihydrofuran of the formula

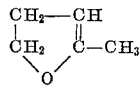

in the presence of a Lewis acid; where R is as defined before. As used herein, the term "Lewis acid" has the meaning accepted in the art and designates a substance containing an atom which has an incomplete electron shell and is therefore electrophilic in character. Some examples of Lewis acids suitable for use in the process of the invention are aluminum chloride, aluminum bromide, and boron trifluoride. The preferred Lewis acid is boron trifluoride which is normally used in the form of the etherate. Some suitable solvents for use in the reaction are benzene, nitrobenzene, pentane, hexane, methylene chloride, dioxane, tetrahydrofuran, ether, and ethyl acetate. The N-benzylidene-2-dibenzofuranamine compound and the 5-methyl-2,3-dihydrofuran are normally used in equimolar quantities although an excess of either can be used if desired. It is customary to use less than an equimolar amount of the Lewis acid and a catalytic amount is sufficient. The time and temperature of the reaction are not critical. The reaction is exothermic at room temperature and, thus, external heating is not necessary. In general, the reaction is carried out at a temperature of from 0 to 100° C. for from 1 to 24 hours, the preferred conditions being room temperature for approximately 3 hours or until the exothermic reaction subsides. If desired, the progress of the reaction can be followed by thin layer chromatography and the product isolated when all or the calculated amount of the N-benzylidene-2-dibenzofuranamine compound has been consumed.

In carrying out the foregoing process, the reaction product can be, and in many cases is, formed as a mixture of four racemates or dl-pairs. Two of these racemates are the products identified herein as isomer A and isomer B. The other two racemates are isomeric compounds differing in the structural form and the fused pentacyclic ring system. Means for separating these mixtures and identifying the components are explained in greater detail below.

The N-benzylidene-2-dibenzofuranamine compounds required as starting materials in the foregoing process can be obtained by reacting 2-dibenzofuranamine with benzaldehyde or a substituted benzaldehyde, preferably in the presence of an acidic catalyst such as p-toluenesulfonic acid monohydrate.

Also in accordance with the invention, the lower alkyl and lower cycloalkyl ethers of the invention, that is the compounds wherein R represents lower alkoxy or lower cycloalkyloxy, can be produced by reacting the corresponding hydroxy compounds with an alkylating or a cycloalkylating agent whereby the hydroxy group is converted to a lower alkoxy or a lower cycloalkyloxy group. The alkylating or cycloalkylating agent is preferably a reactive derivative of a lower alkanol or lower cycloalkanol such as dimethyl sulfate, ethyl iodide, propyl bromide, propyl iodide, butyl iodide, cyclopentyl bromide, or methyl p-toluenesulfonate. The alkylation or cycloalkylation reaction is carried out in an unreactive solvent such as ether, tetrahydrofuran, dioxane, benzene, N-methyl-2-pyrrolidinone, or dimethylformamide, preferably in the presence of a strong base. Some examples of suitable strong bases are alkali metal hydrides, alkali metal amides, alkali metal alkoxides, and alkali metal hydroxides. A preferred strong base is sodium hydride. The hydroxy compound, base, and alkylating or cycloalkylating agent can be used in equimolar quantities although an excess of the alkylating or cycloalkylating agent can also be used if desired. The time and temperature of the reaction are not critical and the reaction is conveniently carried out at a temperature of 0–50° C. or the reflux temperature of the solvent for from 30 minutes to 2 hours.

Further in accordance with the invention, the esters of the invention, that is the compounds wherein R represents —OAc, can be produced by reacting the corresponding hydroxy compounds (wherein R represents hydroxy) with a carboxylic acid of the formula AcOH or a reactive derivative thereof; where Ac is as defined before. Some examples of suitable reactive derivatives of the carboxylic acid are the acid halides and the acid anhydrides. The reactants can be used in equimolar amounts although it is preferable to use an excess of the carboxylic acid or its reactive derivative. The reaction can be carried out in the absence of a solvent or in the presence of a suitable solvent such as a tertiary amine, ether, tertiary amide, aromatic hydrocarbon, or halogenated hydrocarbon. The reaction is preferably carried out in the presence of a base. Some examples of suitable bases are alkali metal hydrides, alkali metal amides, alkali metal alkoxides, and tertiary amines. A preferred solvent is pyridine which can also serve as the base in the reaction. When the carboxylic acid is a reactant, the reaction is sometimes carried out under acidic conditions. The time and temperature of the reaction are not critical but in general higher temperatures and a longer reaction time are used when the carboxylic acid is a reactant rather than one of its reactive derivatives. Normally the reaction is carried out at a temperature from 0 to 100° C., or the reflux temperature of the solvent, for from one to 24 hours. In order to avoid side reactants, it is desirable to avoid the use of conditions more drastic than necessary.

In many cases the carboxylic acids and their reactive derivatives required as starting materials in the foregoing process are known compounds. In other cases they can be prepared by any of a variety of methods. For example, an alkali metal derivative of a compound of the formula $$CH_3-CH-COOH$$
$$CH_3$$

is reacted in an anhydrous solvent with a phenoxyalkyl halide of the formula

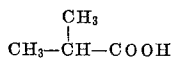

and the reaction mixture then hydrolyzed with aqueous acid to produce a carboxylic acid of the formula

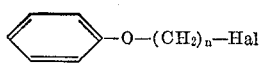

where $n$ is an integer and Hal represents halogen, preferably chlorine or bromine. The carboxylic acids can then be converted to the acid chlorides by reaction with thionyl chloride.

Still further in accordance with the invention, the hydroxy compounds of the invention, that is the compounds wherein R represents hydroxy, can be produced by reacting the corresponding esters (wherein R represents —OAc) with a hydrolytic agent; where Ac is as defined before. Some examples of suitable hydrolytic agents are water and aqueous solutions of bases or acids, such as alkali metal hydroxides, alkaline earth metal hydroxides, alkali metal carbonates, trialkylammonium hydroxides, mineral acids, and strong organic acids. It is desirable to use also an additional solvent such as a lower alkanol, or glycol, or a water soluble ether. At least the calculated amount and preferably a considerable excess of the hydrolytic agent is used. While the time and temperature of the reaction are not critical, it is customary to carry out the hydrolysis at a temperature of from 15 to 150° C., or at the reflux temperature, for from 15 minutes to 96 hours, the longer reaction times being used at the lower temperatures. In the case of the hydrolysis of esters which are not sterically hindered, the customary reaction conditions are 65–85° C. for a period of one to 4 hours.

As indicated previously, the compounds of the invention exist in the forms designated "isomer A" and "isomer B." Each of isomer A and isomer B exists in racemic form as well as in optically active d- and l-forms. When the compounds of the invention are produced by reacting an N-benzylidene-2-dibenzofuranamine compound with 5-methyl-2,3-dihydrofuran, the reaction product normally consists of four racemates or dl-pairs. Two of these racemates are the products designated isomer A and isomer B. The other two racemates are isomeric products having a different structural form of the fused pentacyclic ring system. The four racemates are formed in varying proportions depending on the particular compounds and reaction conditions involved.

With particular reference to isomer A and isomer B, when subsequent reactions are carried out such as alkylation or cycloalkylation of a phenolic group, esterification of a phenolic group, or hydrolysis of a phenolic ester, these reactions do not normally involve interconversion between the isomer A form and the isomer B form. For example, if a hydroxy compound of the invention in the form of 100% isomer B is esterified, the reaction product will consist of 100% of the isomer B form. On the other hand, if an ester of the invention consisting of 25% isomer A and 75% isomer B is fractionated by crystallization or by chromatography, the proportion of each isomer will vary from fraction to fraction.

One of the best methods of identifying and distinguishing isomer A and isomer B or measuring the proportions of isomer A and isomer B present in a mixture which may also contain the other isomeric products mentioned above, is by determining the nuclear magnetic resonance spectrum. For example, the nuclear magnetic resonance spectrum of isomer A and isomer B or a mixture of the isomers is determined in a 60-megacycle nuclear magnetic resonance spectrometer in an appropriate solvent containing tetramethylsilane as an internal standard. The tetramethylsilane peak is arbitrarily assigned a value of 0 parts per million. In general, the peak from the 12d-methyl group in isomer A is located downfield relative to the peak from the 12d-methyl group in isomer B. Thus, in dimethyl-$d_6$ sulfoxide (all hydrogens of dimethyl sulfoxide substituted by deuterium) the 12d-methyl signal is at 1.89 parts per million in isomer A; at 1.50 parts per million in isomer B. Under the same conditions, the corresponding methyl signal from the other two isomers mentioned above, is at 1.71 parts per million and 1.39 parts per million. In addition, isomer A and isomer B each shows characteristic infrared absorption at 800–810 reciprocal centimeters. In the other structural isomers mentioned above, the corresponding infrared absorption is formed at 850–870 reciprocal centimeters.

Isomer A and isomer B can be separated from each other and from other isomeric components in a mixture by any of a variety of methods such as by fractional crystallization and by chromatography. Some examples of chromatographic adsorbents are alumina and silica gel, suitably used with benzene or other non-polar solvents. Either isomer A or isomer B can be separated into the optically active d- and l-forms by resolution procedures. For example, a hydroxy compound of the invention is esterified with an optically active acid. The resulting diastereoisomeric esters are separated by fractional crystallization and, if desired, reconverted by hydrolysis to the optically active hydroxy compounds.

The heterocyclic amino group present in the compounds of the invention is a weakly basic group. The hydroxy group present in some of the compounds of the invention is a weakly acidic, phenolic group. Accordingly, the compounds of the invention have varied and somewhat limited capabilities for salt formation. By virtue of their properties as weak bases, they form salts with mineral acids such as hydrochloric acid, hydrobromic acid, sulfuric acid, and phosphoric acid, and with strong organic acids such as p-toluenesulfonic acid. By virtue of their properties as weak acids, the compounds containing a hydroxy group form salts with relatively strong inorganic and organic bases such as sodium hydroxide, potassium hydroxide, tetramethylammonium hydroxide, and choline. The compounds of the invention containing a hydroxy group also exist to a limited extent in the form of salts formed by interaction between the heterocyclic amino group and the hydroxy group. The salts formed with various acids and bases are generally equivalent to the corresponding parent compounds and are within the scope of the invention. However, the salts with external acids and bases are not preferred forms of the invention because they are relatively unstable and tend to dissociate under neutral conditions and in aqueous media.

The compounds of the invention are new chemical substances, of value as chemical intermediates and as pharmacological agents which exhibit hypocholesteremic activity. The hypocholesteremic activity of the compounds of the invention can be measured by observing their effect on plasma cholesterol levels in rats. Male rats weighing 200–250 g. are maintained on a normal pellet diet. Each rat in a group of ten is given a selected daily dose of a test compound by intubation for one week. Control rats are maintained on the same diet without a test compound. At the end of this period the animals are weighed and sacrificed. Average plasma cholesterol levels are determined in the treated rats and compared with average plasma cholesterol levels of untreated controls. The blood samples are taken from the vena cava. The analytical method used is described in "Journal of Laboratory and Clinical Medicine," 50, 318 (1957).

In a representative determination according to the foregoing procedure, 2,3,3a,4,5,12d-hexahydro-12d-methyl-4-phenylbenzofuro[3,2-f]furo[3,2-c]quinoline (50% isomer A and 50% isomer B) at a dose of 25 mg./kg./day produced a 22% reduction in the cholesterol level. Some preferred compounds of the invention are those in which the term R represents hydroxy or methoxy. In the rat test described above, p-(2,3,3a,4,5,12d-hexahydro-12d-methylbenzofuro[3,2-f]furo[3,2 - c]quinolin-4-yl)phenol (isomer B) at 5 mg./kg./day produced a 68% reduction in the cholesterol level. Similarly, 2,3,3a,4,5,12d-hexahydro-4-(p-methoxyphenyl)-12d - methylbenzofuro[3,2 - f]furo[3,2-c]quinoline (isomer B) at 5 mg./kg./day produced a 62% reduction in the cholesterol level. The compounds of the invention are active on oral administration and can also be given by the parenteral route if desired.

For use as hypocholesteremic agents, the preferred stereochemical form of the compounds of the invention is as isomer B or as mixtures containing a high proportion of isomer B. In general, isomer B has a much higher degree of hypocholesteremic activity than isomer A.

The invention is illustrated by the following examples.

EXAMPLE 1

A solution of 12 g. of N-benzylidene-2-dibenzofuranamine, 200 ml. of benzene, and 0.25 ml. of boron trifluoride etherate is treated with 3.9 g. of 5-methyl-2,3-dihydrofuran. There is a mildly exothermic reaction after which the mixture is concentrated almost to dryness to give a residue of 2,3,3a,4,5,12d-hexahydro-12d-methyl-4-phenylbenzofuro[3,2-f]furo[3,2-c]quinoline; M.P. 138–141° C. following crystallization from isopropyl alcohol (50% isomer A and 50% isomer B).

EXAMPLE 2

A solution of 20 g. of N-p-hydroxybenzylidene-2-dibenzofuranamine, 300 ml. of dioxane, and 0.25 ml. of boron trifluoride etherate is treated with 6 g. of 5-methyl-2,3-dihydrofuran. The resulting reaction mixture is stirred for 2 hours and diluted with 3.5 liters of water. The insoluble product is collected on a filter. It is crude p-(2,3,3a,4,5,12d-hexahydro - 12d - methylbenzofuro[3,2-f]furo[3,2-c]quinolin - 4 - yl)phenol. Following crystallization from ethanol, it has M.P. 251–253° C. (isomer B). Isomer A can be obtained from the crystallization liquor by evaporation and chromatography of the residue.

EXAMPLE 3

A solution of 35 g. of N-p-methoxybenzylidene-2-dibenzofuranamine, 500 ml. of benzene, and 1 ml. of boron trifluoride etherate is treated with 10 g. of 5-methyl-2,3-dihydrofuran. The resulting reaction mixture is stirred for 3 hours and concentrated almost to dryness. The residue is crystallized once from aqueous methanol and then twice from isopropyl alcohol to give a mixture of isomeric products. For separation of isomers, the product is dissolved in benzene and the benzene solution is poured onto a chromatography column prepared with 1700 g. of alumina. The column is eluted with benzene and the eluate is collected in fractions. The fractions, which upon evaporation give a product having M.P. about 177–179° C., are combined. This product is 2,3,3a,4,5,12d-hexahydro-4-(p-methoxyphenyl) - 12d - methylbenzofuro[3,2-f]furo[3,2-c]quinoline (isomer B).

EXAMPLE 4

A solution of 10.4 g. of p-(2,3,3a,4,5,12d-hexahydro-12d - methylbenzofuro[3,2 - f]furo[3,2 - c]quinolin-4-yl) phenol (isomer B), 5 ml. of water containing 5 g. of potassium hydroxide, and 250 ml. of acetone is treated dropwise at 5° C. with 5 ml. of dimethyl sulfate. The resulting solution is allowed to stand for one hour and warm to room temperature. It is then diluted with 500 ml. of water and the insoluble product is collected on a filter. It is 2,3,3a,4,5,12d-hexahydro-4-(p-methoxyphenyl)-12d-methylbenzofuro[3,2 - f]furo[3,2 - c]quinoline; M.P. 177–179° C. following crystallization from acetonitrile (isomer B).

EXAMPLE 5

A solution of 3.7 g. of p-(2,3,3a,4,5,12d-hexahydro-12d - methylbenzofuro[3,2 - f]furo[3,2 - c]quinolin-4-yl) phenol (isomer B) and 50 ml. of dimethylformamide is treated with 0.5 g. of a 55% mineral oil dispersion of sodium hydride. After hydrogen evolution ceases, the mixture is treated with a solution of 1.1 g. of bromoethane in a small amount of dimethylformamide, stirred for 3 hours, and diluted with water. The insoluble product is collected on a filter. It is 4-(p-ethoxyphenyl)-2,3,3a,4,5, 12d-hexahydro - 12d - methylbenzofuro[3,2-f]furo[3,2-c]quinoline; M.P. 189–191° C. following crystallization from acetonitrile (isomer B).

In the same manner, by the substitution of an equivalent amount of 2-bromopropane for the bromoethane, the product obtained is 2,3,3a,4,5,12d-hexhydro-4-(p-isopropoxyphenyl) - 12d - methylbenzofuro[3,2 - f]furo[3,2-c]quinoline (isomer B).

In the same manner, by the substitution of an equivalent amount of bromocyclopentane for the bromoethane, the product obtained is 4-[p-(cyclopentyloxy)phenyl]-2,3,3a,4,5,12d - hexahydro - 12d - methylbenzofuro[3,2-f]furo[3,2-c]quinoline (isomer B).

In the same manner, by the substitution of an equivalent amount of 1-bromopentane for the bromoethane, the product obtained is 2,3,3a,4,5,12d-hexahydro-12d-methyl-4 - [p - pentyloxy)phenyl]benzofuro[3,2 - f]furo[3,2 - c]quinoline; M.P. 132–134° C. following crystallization from isopropyl alcohol (isomer B).

EXAMPLE 6

A solution of 2.0 g. of p-(2,3,3a,4,5,12d-hexahydro-12d-methylbenzofuro[3,2-f]furo[3,2-c]quinolin - 4 - yl)phenol (isomer B) and 40 ml. of pyridine is treated with 0.5 ml. of acetyl chloride. The reaction mixture is stirred for 2 hours at room temperature and poured into an excess of water. The aqueous mixture is extracted with chloroform and the chloroform extract is washed with dilute hydrochloric acid and with water, dried over potassium carbonate, and evaporated to dryness. The product is p-(2,3,3a, 4,5,12d-hexahydro - 12d - methylbenzofuro[3,2-f]furo[3,2-c]quinolin-4-yl)phenol, acetate ester; M.P. 221–226° C. following crystallization from acetonitrile (isomer B).

The following additional compounds are obtained by substituting an equivalent amount of another acid chloride for the acetyl chloride in the foregoing procedure. In each of these cases, the product is isomer B.

From heptanoyl chloride, the product is heptanoic acid, p-(2,3,3a,4,5,12d - hexahydro - 12d - methylbenzofuro[3,2-f]furo[3,2-c]quinolin-4-yl)phenyl ester; M.P. 141–144° C.

From palmitoyl chloride, the product is palmitic acid, p-(2,3,3a,4,5,12d) - hexahydro - 12d - methylbenzofuro[3,2-f]furo[3,2-c]quinolin-4-yl)phenyl ester; M.P. 102–105° C. following crystallization from ethanol.

From phenoxyacetyl chloride, the product is phenoxyacetic acid, p-(2,3,3a,4,512d - hexahydro - 12d - methylbenzofuro[3,2-f]furo[3,2-c]quinolin - 4 - yl)phenyl ester; M.P. 174–177° C. following crystallization from ethanol.

From benzoyl chloride, the product is p-(2,3,3a,4,5,12d-hexahydro-12d-methylbenzofuro[3,2-f]furo[3,2 - c]quinolin-4-yl)phenol, benzoate ester; M.P. 107–113° C.

From methoxyacetyl chloride, the product is p-(2,3,3a, 4,5,12d-hexahydro - 12d - methylbenzofuro[3,2-f]furo[3,2-c]quinolin-4-yl)phenol, methoxyacetate ester.

From 2-(2,4,6-trichlorophenoxy)propionyl chloride, the product is 2-(2,4,6-trichlorophenoxy)propionic acid, p-(2,3,3a,4,5,12d-hexahydro - 12d - methylbenzofuro[3,2-f]furo[3,2-c]quinolin-4-yl)phenyl ester.

From 2,2-dimethyl-5-phenoxyvaleryl chloride, the product is 2,2-dimethyl-5-phenoxyvaleric acid, p-(2,3,3a,4,5, 12d-hexahydro - 12d - methylbenzofuro[3,2-f]furo[3,2-c]quinolin-4-yl)phenyl ester.

From 2-methyl - 2 - (p-chlorophenoxy)propionyl chloride, the product is 2-methyl-2-(p-chlorophenoxy)propionic acid, p-(2,3,3a,4,5,12d-hexahydro - 12d - methylbenzofuro[3,2-f]furo[3,2-c]quinolin-4-yl)phenyl ester.

From 2-(2,4-dibromophenoxy)propionyl chloride, the product is 2-(2,4-dibromophenoxy)propionic acid, p-(2,3, 3a,4,5,12d-hexahydro - 12d - methylbenzofuro[3,2-f]furo[3,2-c]quinolin-4-yl)phenyl ester.

From cyclohexanecarbonyl chloride, the product is cyclohexanecarboxylic acid, p-(2,3,3a,4,5,12d - hexahydro-12d-methylbenzofuro[3,2-f]furo[3,2-c]quinolin - 4 - yl) phenyl ester.

From cinnamoyl chloride, the product is cinnamic acid, p-(2,3,3a,4,5,12d - hexahydro - 12d - methylbenzofuro[3,2-f]furo[3,2-c]quinolin-4-yl(phenyl ester; M.P. 185–187° C. following crystallization from acetonitrile.

From 3,4-dichlorobenzoyl chloride, the product is 3,4-dichlorobenzoic acid, p-(2,3,3a,4,5,12d - hexahydro-12d-methylbenzofuro[3,2-f]furo[3,2-c]quinolin - 4 - yl)phenyl ester; M.P. 213–215° C. following crystallization from acetonitrile.

From 3-pyridinecarbonyl chloride, the product is nicotinic acid, p-(2,3,3a,4,5,12d-hexahydro - 12d - methylbenzofuro[3,2-f]furo[3,2-c]quinolin - 4 - yl)phenyl ester; M.P. 193–195° C. following crystallization from isopropyl alcohol.

From 2-quinolinecarbonyl chloride, the product is 2-quinolinecarboxylic acid, p-(2,3,3a,4,5,12d - hexahydro-12d-methylbenzofuro[3,2-f]furo[3,2-c]quinolin - 4 - yl) phenyl ester; M.P. 218–221° C. following crystallization from acetonitrile.

From 2-furoyl chloride, the product is 2-furoic acid, p-(2,3,3a,4,5,12d - hexahydro - 12d - methylbenzofuro[3,2-f]furo[3,2-c]quinolin - 4 - yl) phenyl ester; M.P. 172–173° C. following crystallization from isopropyl alcohol.

From 2-thiophenecarbonyl chloride, the product is 2-thiophenecarboxylic acid, p-(2,3,3a,4,5,12d - hexahydro-12d-methylbenzofuro[3,2-f]furo[3,2-c]quinolin - 4 - yl) phenyl ester; M.P. 164–165° C. following crystallization from ethanol.

Similarly, esters are obtained by reacting p-(2,3,3a,4, 5,12d - hexahydro - 12d - methylbenzofuro[3,2-f]furo[3,2-c]quinolin-4-yl)phenol with the acid chloride of each of the following acids.

l-phenylbutyric acid
2-(4-biphenylyl)butyric acid
4-phenyl-3-methyl-3-butenoic acid
2-(4-biphenylyl)-4-hexenoic acid
N-[1-methyl-2,3-bis(p-chlorophenyl)propyl]maleamic acid
2-methyl-2-[p-(1,2,3,4-tetrahydro-1-naphthyl)phenoxy] propionic acid
5-methylpyrazole-3-carboxylic acid
3-pyridineacetic acid
3,4,5-trimethoxybenzoic acid
O-acetylmandelic acid
2-chlorocinchoninic acid The acid chlorides of the above acids can be obtained by reacting the corresponding acids with thionyl chloride.

EXAMPLE 7

A mixture of 2.0 g. of p-(2,3,3a,4,5,12d-hexahydro-12d-methylbenzofuro[3,2-f]furo[3,2-c]quinolin - 4 - yl) phenol, acetate ester (isomer B), 200 ml. of methanol, 25 ml. of water, and 5.0 g. of sodium hydroxide is heated at reflux for 2 hours. The methanol is removed by distillation and the remaining aqueous mixture is made slightly acidic with dilute hydrochloric acid. The insoluble product is collected on a filter. It is p-(2,3,3a,4,5,12d - hexahydro-12d-methylbenzofuro[3,2-f]furo[3,2-c]quinolin - 4 - yl) phenol; following crystallization from ethanol, it has M.P. 251–253° C. (isomer B).

Starting materials

A mixture of 11 g. of 2-dibenzofuranamine, 6.4 g. of benzaldehyde, 0.2 g. of p-toluenesulfonic acid monohydrate, and 150 ml. of benzene is heated at reflux for 15 hours with continuous removal of the water formed in the reaction. The mixture is distilled in vacuo to give a residue of N-benzylidene-2-dibenzofuranamine; M.P. 116–117° C. following crystallization from cyclohexane.

A solution of 18.3 g. of 2-dibenzofuranamine, 12.2 g. of p-hydroxybenzaldehyde, 0.2 g. of p-toluenesulfonic acid monohydrate, and 200 ml. of benzene is heated at reflux for 2 hours or until the calculated amount of water has been collected. It is then cooled to room temperature and the insoluble product, N-p-hydroxybenzylidene-2-dibenzofuranamine is collected on a filter; M.P. 230–232° C. following crystallization from ethanol.

A boiling solution of 40 g. of 2-dibenzofuranamine and 500 ml. of benzene is treated dropwise with 30 g. of p-anisaldehyde and the resulting solution is heated at reflux until the calculated amount of water has been collected. It is then treated with activated charcoal, filtered, concentrated to a volume of 200 ml., and cooled. The insoluble product is collected on a filter. It is N-p-methoxybenzylidene-2-dibenzofuranamine; M.P. 124–125° C. following crystallization from cyclohexane.

With stirring and external cooling to maintain the temperature below 10° C., 250 ml. of a 1.6 N solution of n-butyllithium in heptane is added to a solution of 41 g. of diisopropylamine and 250 ml. of anhydrous tetrahydrofuran under nitrogen. The resulting mixture contains lithium diisopropylamide. After 10 minutes a solution of 17.6 g. of isobutyric acid in 25 ml. of tetrahydrofuran is added and the reaction mixture is stirred an additional 10 minutes at 0° C. and an additional 30 minutes at room temperature. It is cooled again to 0° C. and treated with a solution of 43.0 g. of 3-phenoxypropyl bromide in 50 ml. of tetrahydrofuran while the temperature is maintained below 10° C. After 15 minutes the mixture is allowed to warm to room temperature and stirring is continued for 16 hours. The mixture is hydrolyzed with 500 ml. of water and the aqueous phase is separated, washed with 200 ml. of ether, and acidified with 70 ml. of 6 N sulfuric acid to give an insoluble product, 2,2-dimethyl-5-phenoxyvaleric acid. For purification, the product is dissolved in ether and the ether solution is washed with water, dried over magnesium sulfate, and evaporated. The product is crystallized from isooctane; M.P. 73–75° C. A solution of 15.6 g. of 2,2-dimethyl-5-phenoxyvaleric acid, 1 ml. of pyridine, and 75 ml. of methylene chloride is treated with 7 ml. of thionyl chloride. The mixture is heated at reflux for 2 hours and distilled to dryness under reduced pressure to leave a residue of 2,2-dimethyl-5-phenoxyvaleryl chloride.

We claim:

1. A compound of the formula

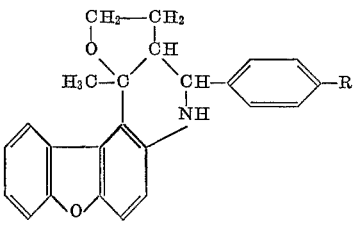

where R is a member of the class consisting of hydrogen, hydroxy, lower alkoxy, lower cycloalkyloxy, and —OAc; where Ac is an acyl group of a carboxylic acid of the class consisting of
   (a) lower alkanoic acids,
   (b) lower alkanoic acids additionally substituted by a member of the class consisting of methoxy, phenoxy, monohalophenoxy, dihalophenoxy, and trihalophenoxy,
   (c) lower cycloalkanecarboxylic acids,
   (d) benzoic acid,
   (e) benzoic acid additionally substituted by chlorine,
   (f) cinnamic acid,
   (g) nicotinic acid,
   (h) 2-quinolinecarboxylic acid,
   (i) 2-furoic acid, and
   (j) 2-thiophenecarboxylic acid.

2. A compound according to claim 1 which is p-(2,3,3a,4,5,12d - hexahydro - 12d-methylbenzofuro[3,2-f]furo[3,2-c]quinolin-4-yl)phenol.

3. A compound according to claim 1 which is 2,3,3a,4,5,12 - hexahydro - 4 - (p-methoxyphenyl)-12d-methylbenzofuro[3,2-f]furo[3,2-c]quinoline.

4. A compound according to claim 1 in which R is —OAc; wherein Ac is as defined in claim 1.

5. A compound according to claim 1, in the sterochemical form in which the phenyl or substituted phenyl group at position 4 has the cis-configuration relative to the 3a-hydrogen atom and the 12d-methyl group.

References Cited

UNITED STATES PATENTS

| | | | |
|---|---|---|---|
| 2,650,227 | 8/1953 | Timmler et al. | 260—288 |
| 2,650,229 | 8/1953 | Timmler et al. | 260—288 |
| 2,691,024 | 10/1954 | Horlen | 260—289 X |
| 3,507,667 | 4/1970 | Kaminsky | 260—287 |

OTHER REFERENCES

Pavarov et al., abstr. in Chem Abstr., vol. 60, col. 9256–7 (1964).

DONALD G. DAUS, Primary Examiner

U.S. Cl. X.R.

260—286 R, 289 R, 295 R, 295 S, 310 R, 332 RC, 346 IR, 346.2 M, 347 S, 479 R, 691; 424—258